Patented Mar. 7, 1944

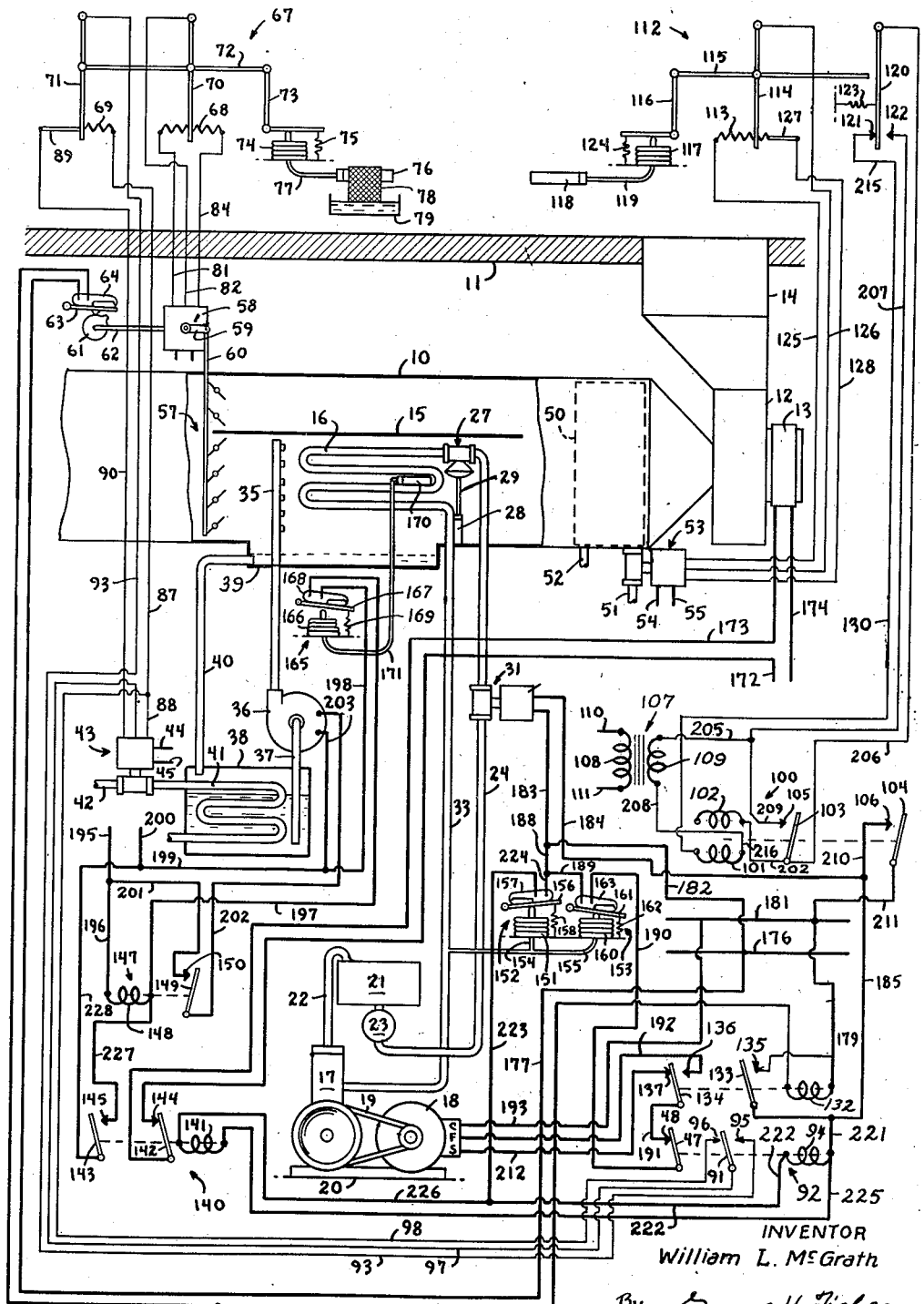

2,343,467

UNITED STATES PATENT OFFICE 2,343,467

AIR CONDITIONING CONTROL SYSTEM

William L. McGrath, Philadelphia, Pa., assignor to Minneapolis-Honeywell Regulator Company, Minneapolis, Minn., a corporation of Delaware Application June 28, 1941, Serial No. 400,283

23 Claims. (Cl. 257—3)

The present invention relates to air conditioning control systems wherein it is desired to maintain predetermined conditions of temperature and humidity over a relatively wide range of load, that is, for example, where the temperature of the air to be conditioned may vary from 50° F. to 100° F. dry bulb and the relative humidity of the air to be conditioned may range from 10% to 90%.

Commonly in the past in this type of air conditioning work wherein dehumidification must be accomplished at dew point temperatures below freezing, refrigerated brine sprays have been used. Control of equipment using brine sprays is difficult and equipment is subject to deterioration. Furthermore, the brine must repeatedly be regenerated as it absorbs moisture.

The primary object of my invention is to obviate the use of brine sprays entirely by using a refrigerating coil for dehumidification purposes, operating it at temperatures below freezing and defrosting it by the use of heated sprays when necessary. My invention comprehends the use of fresh water for the heated sprays and when humidification of the air is required rather than dehumidification, the temperature of the heated sprays being controlled by means responsive to the requirements for humidification. When sensible cooling without dehumidification is required, the refrigerating coil is operated at temperatures above freezing. When the coil is operating at temperatures above freezing, the sprays may be operated without being heated in order to improve the heat exchange between the air being conditioned and the coil.

The refrigerating coil or unit may preferably be the evaporator of a direct expansion refrigeration system, the arrangement of my invention providing for substantially continuous automatic operation.

The primary object of my invention as referred to above is to provide an air conditioning control arrangement wherein dehumidification is to be accomplished at relatively low dew point temperatures by utilizing a direct expansion refrigeration coil, for example, with heated fresh water sprays for humidifying and defrosting purposes.

Another object of the invention is to provide an air conditioning control arrangement wherein a direct expansion refrigeration coil is operated at dew point temperatures below freezing under the control of means responsive to the moisture content of the air being conditioned, the last mentioned means controlling fresh water sprays for humidifying purposes, the arrangement providing for heating and turning on the sprays at maximum temperature when defrosting of the coil is required.

Another object of the invention is to provide an air conditioning control arrangement utilizing a direct expansion refrigeration coil with face and by-pass dampers associated with the coil controlled by means responsive to the moisture content of the air being conditioned, the last mentioned means controlling operation of the direct expansion coil and also a set of heated fresh water sprays which are operated when humidification rather than dehumidification is required.

Another object of my invention is to provide an arrangement wherein a direct expansion refrigeration coil is utilized in an air conditioning control system, the coil having fresh water sprays associated therewith and face and by-pass dampers, the operation of the coil being controlled by a dry bulb thermostat for the purposes of removal of sensible heat from the air and by means responsive to the moisture content of the air for controlling the coil for purposes of removal of latent heat from the air, the moisture responsive means controlling the face and by-pass dampers and the temperature of the fresh water sprays, the fresh water sprays being operated at maximum temperature at times when it is desired to defrost the coil of the direct expansion refrigerating system.

The single figure of the drawing represents an air conditioning system embodying the principles of my invention therein.

Referring to the drawing, numeral 10 represents an air conditioning duct through which air is passed and in which the air is conditioned before being discharged into a space, the air of which is to be maintained at desirable conditions as respects temperature and humidity. The space may be a room or other compartment having a floor represented by the numeral 11. The right-hand end of the duct 10 is connected to the inlet of a fan 12 driven by an electric motor 13, the outlet of the fan being connected to a discharge duct 14 which discharges into the space or room.

Within the duct 10 at an intermediate point is a septum or a partition 15 which divides the duct into a main air passage and a by-pass passage, the latter passage being above the partition 15. Located within the main air passage and below the partition 15 is the evaporator 16 of a compression type refrigerating system. The refrigerating system comprises a compressor 17 driven by an electric motor 18 by means of a belt 19, the compressor and motor being mounted on a common base 20. The motor 18 is of a two speed type having electrical speed changing mechanism including electrical terminals designated C for common and F and S for fast and slow respectively. The discharge of the compressor is connected to a condenser 21 by a pipe 22 and the condenser 21 has a liquid receiver 23 associated therewith which is connected to the evaporator 16 by pipe 24. Interposed in the pipe 24 at the inlet of the evaporator 16 is a thermostatic expansion valve 27 of a known type which is arranged to control the amount of superheat of the refrigerant at the outlet of the evaporator. Valve 27 includes a pressure chamber comprised in part of an expansible wall member, this pressure chamber being connected to a thermal bulb 28 by means of a capillary tube 29, the thermal bulb 28 being disposed in intimate heat exchange relationship with the outlet of the evaporator 16. Also interposed in the pipe 24 ahead of the expansion valve 27 is a solenoid type stop valve 31. The valve 31 is of the on and off type and is controlled by an electrical winding within the portion 32 of the valve. The outlet of the evaporator 16 is connected to the suction side of the compressor by a pipe 33.

Ahead of the evaporator 16 as respects the flow of air through the duct 10 is a pipe 35 having spray nozzles whereby water may be sprayed into the air stream and over the evaporator 16. The pipe 35 is connected to the discharge of a circulating pump 36 which is driven by an electric motor. The suction side of the pump 36 is connected to a pipe 37 which extends into a fresh water tank or sump 38. The portion of the duct 10 adjacent the pipe 35 and evaporator 16 is depressed as shown at 39 so as to form a collecting pan for water which is sprayed from the spray nozzles in pipe 35. The pan 39 is connected to the tank 38 by means of a pipe 40 so that water which collects in the pan may drain back into the tank 38.

Within the tank 38 and disposed in heat exchange relationship with the water therein is a steam coil 41 having a pipe 42 connected to the inlet thereof. Interposed in the pipe 42 is a modulating valve 43 which includes an electric proportioning operating motor of the type disclosed in detail in the patent of D. G. Taylor No. 2,028,110. The motor of this valve is supplied with power by means of wires 44 and 45. This valve is controlled by a proportioning controller like the one shown in the Taylor patent and this controller and its manner of controlling the steam valve 43 will be presently described.

Located in the duct 10 beyond the evaporator 16 is a steam coil 50 for purposes of reheating the air which has been cooled and dehumidified by the evaporator 16. Steam is admitted to the valve 50 through a pipe 51 and the condensate is withdrawn therefrom through a pipe 52. Interposed in the pipe 51 is a valve 53 similar to the valve 43 and which is operated in a similar manner. Power for operation of the motor of valve 53 is supplied through wires 54 and 55 and this valve is controlled also by a proportioning controller which will presently be described.

The flow of air past the sprays 35 and the evaporator 16 and through the by-pass duct is controlled by means of face and by-pass dampers designated by the numeral 57. These dampers are controlled by an electric proportioning damper motor 58 which is of the same type as the motor of the Taylor patent previously referred to. The damper motor 58 has a crank arm 59 which is connected to the face and by-pass dampers by a stem 60. The damper motor 58 operates an auxiliary switch by means of a cam 61 on the shaft 62 of the damper motor. The cam 61 has a single dwell which actuates a pivoted lever 63 carrying the switch which is a mercury switch 64. As will presently be described, the mercury switch 64 is normally open but is closed when the damper 58 operates in a manner to cause a relatively smaller proportion of the air to pass over the evaporator 16.

The damper motor 58 is controlled by an electric proportioning controller designated generally by the numeral 67. This controller is the same general type of proportioning controller as disclosed in the previously mentioned Taylor patent. The proportioning controller 67 is arranged to control both the damper motor 58 and the steam valve 43 and therefore the controller has two proportioning resistances designated by the numerals 68 and 69. Numeral 70 designates a pivoted slider which is adapted to slide over the resistance 68 and numeral 71 designates a pivoted slider adapted to slide over the resistance 69. Numeral 72 designates an operating lever connected to both of the sliders 70 and 71, the right-hand of the lever 72 being connected to a pivoted bell crank lever 73. The other arm of the bell crank lever 73 is normally urged against the operating stem of an expansible and contractible bellows 74 by means of a coil spring 75. The expansible and contractible bellows 74 is connected to a thermal bulb 76 of a wet bulb temperature controller by means of a capillary tube 77. The bulb 76 is filled with the usual volatile liquid and draped over the bulb is a piece of porous fabric 78, the lower edges of which are disposed in a pan of water 79. The piece of fabric 78 acts as a wick causing water to travel upwardly through the fabric by capillary attraction to wet the bulb 76. There is continuously a certain amount of evaporation from the wick depending upon the relative humidity of the atmosphere in the space and this evaporation has a cooling effect upon the bulb 76 so that the temperature of the bulb is depressed below the dry bulb temperature of the space by an amount depending upon the moisture content of the air. Also, the pressure developed within bellows 74 obviously is proportional to the wet bulb temperature of the atmosphere in the space and the bell crank lever 73 is accordingly rotated about its pivot depending upon the wet bulb temperature in the space. Upon a rise in the wet bulb temperature, the bellows 74 expands rotating bell crank lever 73 in a counter-clockwise direction and moving the lever 72 and sliders 70 and 71 to the left. Upon a fall in wet bulb temperature the sliders are moved to the right in an opposite manner.

The left end of resistance 68 is connected to the damper motor 58 by a wire 81 and the slider 70 is connected to the damper motor 58 by a wire 82. The right end of resistance 68 is connected to the damper motor 58 by a wire 84. With the parts in the position shown, the wet bulb temperature is at substantially a desired value and slider 70 is in the mid point of resistance 68. The face and by-pass dampers 57 are in an intermediate position causing desired proportions of air to pass over the sprays and evaporator and through the by-pass. When the wet bulb temperature rises, indicating that the humidity is too great, slider 70 is moved to the left so as to reduce the voltage drop between wires 81 and 82 as respects that between wires 82 and 84 which has the effect of causing motor 58 to operate in a direction to move the face and by-pass dampers into a position wherein a smaller proportion of air is passed over the evaporator 16 and a greater proportion is passed through the by-pass. Upon a fall in wet bulb temperature indicating that humidification rather than dehumidification of the air is required, the slider 70 is moved to the right reducing the voltage drop between wires 82 and 84 as respects that between wires 81 and 82 and this causes the motor 58 to operate in an opposite direction tending to move the face and by-pass dampers into a position wherein a greater portion of air is passed over the evaporator 16 and a smaller proportion through the by-pass.

The right-hand end of resistance 69 is connected to the motor of valve 43 by a wire 87 and a wire 88. The left end of resistance 69 is connected to a contact strip 89, the extremity of which is connected to the operating motor of valve 43 by a wire 90. The slider 71 is connected to a fixed electrical contact 95 forming part of an electrical relay 92 by means of a wire 93. The relay 92 comprises a winding 94 having an armature associated therewith which is attached to the switch blade 91 and which moves the blade into engagement with fixed contact 95 when the winding 94 of the relay 92 is energized. When the winding 94 is deenergized, the blade 91 engages with a fixed electrical contact 96. The fixed electrical contact 96 is connected to the operating motor of valve 43 by means of a wire 98 and wire 88. The switch blade 91 is connected to the operating motor of valve 43 by a wire 97. Relay 92 also includes a switch blade 47 operable thereby which engages a fixed contact 48 when the winding 94 is deenergized. From the foregoing, it is to be seen that contact 95 controls the connection between slider 71 and valve 43 and that when switch blade 91 engages contact 96 a direct connection is produced between control wires 97 and 88. This latter connection, as will presently be described, causes the valve 43 to be operated to a wide open position. The valve 43 is normally controlled by the slider 71 and resistance 69 and with the parts in the position shown, except assuming that blade 91 is engaging contact 95, the valve is in a closed position. Upon a fall in humidity as evidenced by a fall in wet bulb temperature below the intermediate or desired value, the slider 71 moves to the right decreasing the voltage drop between wires 93 and 87 as respects that between wires 90 and 93 and this has the effect of operating valve 43 in an opening direction to admit steam to the coil 41. The coil 41 therefore heats the water in the tank 38 and as will presently be described, this heated water may be sprayed through the spray nozzles 35 so as to humidify the air passing to the space to be conditioned. A rise in wet bulb temperature above the intermediate or desired value will have no effect on valve 43 since slider 71 will merely move along the contact 89. Valve 43 will therefore remain closed under such conditions.

The compressor motor 18 is controlled in part through a double coil relay designated by the numeral 100. This relay comprises a pull-in winding 102 and a bucking winding 101. There is an armature associated with the windings which is connected to a pair of switch blades 103 and 104 which moves to the left into engagement with fixed electrical contacts 105 and 106 respectively, when the pull-in winding 102 is energized and the bucking winding 101 is not. Power for operation of the relay 100 is supplied by a stepdown transformer 107 having a primary winding 108 and a secondary 109 having a fewer number of turns. Power for the primary winding 108 is supplied through wires 110 and 111. The control of the relay 100 will be described presently.

The valve 53 and the relay 100 are controlled by a combined proportioning and on and off controller responsive to dry bulb temperature and designated by the numeral 112. The controller 112 includes a proportioning resistance 113 over which a slider 114 is adapted to sweep. Numeral 115 designates an elongated arm which is connected to the mid point of the slider 114 and the left end of which is pivoted to a pivoted bell crank lever 116. The other arm of the bell crank lever 116 is normally urged into engagement with the operating stem of an expansible and contractible bellows 117 by a coil spring 124, the interior of the bellows being connected to a thermal bulb 118 by a capillary tube 119. The bulb 118 is filled with vaporizable liquid as usual which expands and contracts in accordance with dry bulb temperature in the space, the bellows 117 expanding and contracting proportionately. Numeral 120 designates a pivoted switch blade movable between fixed electrical contacts 121 and 122, the blade 120 normally being biased into engagement with the contact 121 by a coil spring 123. The end of the arm 115 is disposed adjacent the blade 120 and when the bellows 117 expands a predetermined amount, the bell crank lever 116 is rotated in a clockwise direction moving the arm 115 and slider 114 to the right until the end of arm 115 engages the blade 120 moving it away from contact 121 and into engagement with contact 122. Operation of blade 120 occurs at the extremity of travel of slider 114. The left end of resistance 113 is connected to the operating motor of valve 53 by wire 125 and the slider 114 is connected to the valve motor by a wire 126. The right end of resistance 113 is connected to a relatively short contact strip 127, the extremity of which is connected to the operating motor of valve 53 by a wire 128. With the controller 112 in the position shown, the dry bulb temperature is at substantially the required value and the slider 114 is at the mid point of resistance 113 and contact strip 127. When the dry bulb temperature falls, the bellows 117 contracts moving bell crank lever 116 in a counter-clockwise direction and moving arm 115 and slider 114 to the left along resistance 113. This reduces the voltage drop between wires 125 and 126 as respects that between wires 126 and 128. This causes the motor of valve 53 to operate in a direction to open the valve admitting more steam to the reheat coil 50 so as to raise the temperature of the air and to cause the dry bulb temperature in the space to return to the required value wherein the slider 114 is in the position shown. When the dry bulb temperature rises, the bellows 115 expands thus causing slider 114 to move to the right which reduces the voltage drop between wires 126 and 128 as respects that between wires 125 and 126 which causes the valve 53 to be operated toward closed position, and it is in fully closed position when the slider 114 moves on to contact strip 127. Upon a further rise in dry bulb temperature, the blade 120 is then moved away from contact 121 and into engagement with contact 122. The arrangement is preferably such that the blade 120 engages contact 122 at a temperature substantially one degree higher than that at which blade 120 disengages from contact 121. The switch blade 120 and contacts 121 and 122 control the relay 100 as will presently be described.

The variable speed windings of the motor 18 and the solenoid valve 31 are controlled by a relay designated by the numeral 131, this relay comprising a winding 132 having an armature associated therewith which is connected to movable switch blades 133 and 134 which are moved into engagement with fixed electrical contacts 135 and 136 when the winding 131 is energized. When the winding 131 is deenergized, the switch blade 134 normally engages a fixed electrical contact 137.

The motor of pump 36 and the fan motor 13 are controlled by a relay designated by the numeral 140. The relay 140 comprises a winding 141 having an armature associated therewith which is attached to movable switch blades 142 and 143 which are moved to the right, blade 143 engaging fixed electrical contact 145 when the winding 141 is energized. Blade 142 normally engages contact 144 for normally keeping fan 12 in operation through the following circuit for fan motor 13: from wire 172 to contact 144, blade 142, wire 173, motor 13 to wire 174, the wires 172 and 174 being connected to a suitable source of power not shown.

The motor of pump 36 is controlled directly by a relay designated by the numeral 147. The relay 147 comprises a winding 148 having an armature associated therewith which is attached to a movable switch blade 149 which is moved to the left into engagement with a fixed electrical contact 150 when the winding 148 is energized.

The controls for the system additionally includes suction pressure responsive switches designated by the numerals 152 and 153. Switch 152 comprises an expansible and contractible bellows 151, the interior of which is connected to the suction pipe 33 of the compressor by tubes 154 and 155. The bellows 151 has an operating stem which normally engages a pivoted lever 156 carrying a mercury switch 157 having electrodes at its right end. The lever 156 is normally biased against the operating stem of the bellows by a coil spring 158. The bellows 151 expands in response to rising suction pressure and normally maintains the switch 157 open. The bellows 151 contracts upon fall in suction pressure, and at a relatively low value of suction pressure, which will occur when the evaporator has frosted up so as to seriously impair its heat exchange properties, closes the switch 157 and brings about defrosting of the evaporator as will presently be described. The switch 153 comprises an expansible and contractible bellows 160, the interior of which is connected to the suction pipe 33 of the compressor by the tube 155. The bellows 160 has an operating stem into engagement with which a pivoted switch lever 161 is normally urged by a coil spring 162. The lever 161 carries a mercury switch 163 having electrodes at its left end. The switch 163 is closed when the suction pressure rises to a predetermined relatively high value so as to rotate the lever 161 into closed position of the switch. The switch 163 is opened when the suction pressure falls to a predetermined relatively low value.

The relay 147 controlling the motor of pump 36 is controlled by a temperature responsive controller 165. The controller 165 comprises an expansible and contractible bellows 166 having an operating stem normally engaging a pivoted lever 167 carrying a mercury switch 168 having electrodes at its left end. The lever 167 is normally urged in a clockwise direction by a coil spring 169. The interior of bellows 166 is connected to a thermal bulb 170 disposed in intimate heat relationship with an intermediate point of the evaporator 16. The thermal bulb 170 is connected to the bellows 166 by a capillary tube 171. The bulb 170 contains a volatile liquid which expands and contracts in accordance with the temperature of the evaporator 16 causing the bellows 166 to expand and contract accordingly. The controller 165 is so adjusted that the bellows 166 will be expanded sufficiently to cause closure of mercury switch 168 by rotation of the lever 167 in a counter-clockwise direction, when the temperature of the evaporator affecting the bulb 170 is substantially 35° F. When the evaporator is operating at temperature below this, that is temperatures which may be below freezing, the pump 36 is not operated inasmuch as it would not be desirable to spray fresh water onto the evaporator and permit it to freeze thereon.

The arrangement of my invention is set up to provide for substantially continuous operation of the system except when it is necessary to defrost the evaporator. With the parts in the position shown, the wet and dry bulb temperatures are at substantially the desired values. If now there should be a rise in wet bulb temperature, the slider 70 will be moved to the left in the manner already described and the face and by-pass dampers will be readjusted to a position causing a smaller proportion of air to pass over the evaporator 16 and a greater proportion to be by-passed. The controller 67 may be set so that when the slider 70 is at the mid point of resistance 68, the wet bulb temperature is 59° for example. When the slider 70 has been moved a slight amount to the left out of this position, the motor 58 is operated sufficiently to cause cam 61 to close the mercury switch 64. Closure of this switch completes a circuit energizing the relay 131 as follows: from the line conductor 176 through a wire 177 to the mercury switch 64, wire 178, winding 132, wire 179 and wire 180 back to line conductor 181, the line conductors 176 and 181 being connected to any suitable source of power not shown. Upon energization of relay 131, blade 133 engages contact 135 and a circuit is completed for energizing and opening the solenoid valve 31 as follows: from line conductor 176, through wire 182, wire 183, valve 31, wire 184, wire 185, wire 220, switch blade 133, contact 135, wire 186 and wire 180 back to line conductor 181. When solenoid valve 31 is opened, the suction pressure rises causing closure of switch 153, that is, closure of mercury switch 163, or such switch may already be closed as will appear hereinafter. Closure of this switch together with energization of relay 131 causes completion of the high speed circuit of motor 18, this circuit being as follows: from line conductor 176 through wire 182, wire 188, wire 189, mercury switch 163, wire 190, switch blade 47, fixed electrical contact 48, wire 191, switch blade 134, contact 136, wire 192, through the fast and common terminals of motor 18 to wire 193, back to line conductor 181.

It is to be seen that upon a rise in wet bulb temperature, the mercury switch 64 is closed and the refrigerating system is started in operation at high speed. Inasmuch as the compressor motor is operating at high speed and due to the fact that a reduced proportion of air is being passed over evaporator 16, it operates at a relatively low temperature causing an increased amount of dehumidification of the air. If the wet bulb temperature continues to rise, slider 70 continues to move to the left and the face and by-pass dampers 57 are moved into a position wherein a still greater proportion of air is by-passed and a smaller proportion is passed over the evaporator 16, the refrigerating system continuing to operate at high speed. Stop means may be provided to limit the damper movements.

As the wet bulb temperature rises as described, the slider 71 moves over onto the contact strip 89 without operating the motor of valve 44, this valve remaining in a closed position.

During this dehumidifying operation just described, the operation of the refrigerating system will remove a certain amount of sensible heat as well as latent heat from the air and more than likely the dry bulb temperature in the space being conditioned will tend to fall. If this occurs, the bellows 117 will contract in the manner above described moving the slider 114 to the left along resistance 113, causing the valve 53 to be operated in an opening direction so as to admit steam to the reheat coil 50. The steam coil 50 will reheat the air which has passed over the evaporator tending to bring it back to the proper dry bulb temperature and causing the controller 112 to reassume the position shown in the drawing. That is, the controller 112 will control the dry bulb temperature of the air.

The above described dehumidifying operation will normally tend to cause the wet bulb temperature to drop back to the desired value, the slider 70 moving back to the mid position of resistance 68. As the wet bulb temperature returns to the desired value, the face and by-pass dampers will be returned to the position shown in the drawing and the mercury switch 64 will be opened so as to interrupt operation of the refrigerating system. When the mercury switch 64 is opened, the relay 131 is of course deenergized interrupting the high speed circuit of the compressor, and the solenoid valve 31 is closed. When switch blade 134 engages contact 137, the low speed circuit of the compressor motor is completed as follows: from line conductor 176, to wire 182, wire 188, wire 189, mercury switch 163, wire 190, switch blade 47, wire 191, switch blade 134, contact 137, wire 212, the S and C terminals of motor 18 and wire 193 back to line conductor 181. Completion of this circuit causes operation of the compressor at low speed. This quickly pumps down the evaporator since the liquid line valve 31 is closed, causing opening of switch 163 and complete stoppage of the compressor.

If the wet bulb temperature falls below the desired value of 59°, the slider 70 moves to the right along resistance 68 causing the face and by-pass dampers to be operated to a position wherein a greater proportion of air is passed over the evaporator 16 and a reduced proportion is by-passed. At the same time the slider 71 moves to the right along resistance 69 causing valve 43 to be operated in an opening direction as above described, admitting steam to the coil 41 for heating the water in the tank 38. The mercury switch 64 will under these circumstances be open and the increased amount of air passing over the evaporator 16 will raise its temperature to a value above 35° F. causing the controller 165 to close the mercury switch 168 completing a circuit for relay 147 as follows: from line conductor 195 to a wire 196, the winding 148, through wire 197, mercury switch 168, wire 198, wire 199, back to line conductor 200, the line conductors 195 and 200 being connected to a suitable source of power not shown. Energization of the relay 147 moves switch blade 149 into engagement with contact 150 completing a circuit for the motor of pump 36 as follows: from line conductor 195, through wire 201, contact 150, switch blade 149, wire 202, the motor of pump 36, wire 203, wire 199 back to line conductor 200. Operation of the pump 36 will cause heated water from tank 38 to be pumped up through pipe 35 and discharged through the spray nozzles into the air stream passing over the evaporator 16. This heated water will serve to humidify the air, the air taking up more moisture by reason of the fact that the water is heated. Continued fall in wet bulb temperature causes the steam valve 43 to be opened wider and wider so as to heat the water in tank 38 more and more. When the wet bulb temperature returns to its normal value, the slider 71 and the slider 70 are moved back to their normal positions and the valve 43 and dampers 57 will again assume their normal positions.

The controller 112 may be so adjusted that the slider 114 is at the mid point of resistance 113 and contact strip 127 when the dry bulb temperature is 70° for example. The controller 112 may be so adjusted that the arm 115 opens contact 121 at 71° and closes blade 120 to engage contact 122 at 72°, for example. If at any time the dry bulb temperature should rise high enough so as to cause blade 120 to engage contact 122, a circuit is completed for pull-in winding 102 of relay 100 as follows: from secondary winding 109 of transformer 107 to wire 205, wire 207, contact 122 to blade 120, wire 206, wire 202, winding 102, wire 208 back to secondary 109. Energization of winding 102 causes blades 103 and 104 to move to the left into engagement with their respective contacts, engagement of blade 103 with contact 105 completing a maintaining circuit for winding 102 as follows: from secondary 109, through wire 205, wire 209, contact 105, blade 103, wire 202, winding 102 and wire 208 back to secondary 109. When blade 104 engages contact 106, a circuit is completed for the solenoid valve 31 as follows: from line conductor 176, through wire 182, wire 183, valve 31, wire 184, wire 210, contact 106, blade 104, wire 211 back to line conductor 181. When solenoid valve 31 is opened, the suction pressure in pipe 33 rises causing closure of switch 163 in the same manner as already described, closure of this switch now completing a circuit for the slow speed winding of motor 18, this circuit being as follows: from line conductor 176, through wire 182, wire 188, wire 189, mercury switch 163, wire 190, switch blade 47, contact 48, wire 191, switch blade 134, contact 137, wire 212 through the low speed and common terminals of motor 18 through wire 193, back to line conductor 181. The refrigerating system will now operate at low speed until the dry bulb temperature has fallen sufficiently to cause blade 120 to move away from contact 122 and to engage contact 121. When this occurs, a circuit will be completed for the bucking winding 101 of relay 100 as follows: from secondary winding 109, through wire 205, wire 209, contact 105, blade 103, wire 206, blade 120, contact 121, wire 215, winding 101, wire 216, and wire 208 back to secondary 109. Both windings 101 and 102 will now be energized and so their magnetizations will neutralize each other causing the relay to drop out deenergizing both windings. Disengagement of blade 104 from contact 106 will interrupt the circuit of solenoid valve 31 and the compressor will then quickly pump down the coil causing opening of mercury switch 163 which will interrupt the circuit of the compressor motor causing it to stop.

During the time that the compressor operates at low speed, the evaporator operates at a relatively high temperature so that controller 165 causes pump 36 to operate through the circuit already described. The sprays thus saturate the air passing the evaporator; the heat exchange between the air and the evaporator is improved and the sensible cooling requirements were readily taken care of. However, valve 43 will be closed so that this water will be unheated.

When the compressor is operating at high speed in response to humidity requirements the evaporator 16 may become frosted up so that its heat exchange properties are seriously impaired. When this occurs, the suction pressure will fall to a relatively low value causing closure of switch 152, that is, closure of mercury switch 157. When this occurs, the relays 92 and 140 will be energized. The circuit for relay 92 is as follows: from line conductor 181, through wire 180, wire 186, contact 135, switch blade 133, wire 220, wire 221, winding 94, wire 222, wire 223, mercury switch 157, wire 224, wire 188, wire 182, back to line conductor 176. At the same time winding 141 of relay 140 is energized through the following circuit: from line conductor 181, through wire 180, wire 186, contact 135, switch blade 133, wire 220, wire 221, wire 225, winding 141, wire 226, wire 223, mercury switch 157, wire 224, wire 188, wire 182, back to line conductor 176. When relay 92 is energized, switch blade 47 is moved away from contact 48, this interrupting the circuit supplying power to the compressor motor and causing it to stop. Switch blade 91 is moved away from contact 96 and into engagement with contact 95. Disengagement of blade 91 from contact 96 interrupts the connection of slider 71 to the operating motor of valve 43 and therefore interrupts control of this valve by the controller 67. Engagement of blade 91 with contact 95 connects wire 97 to wire 88, thus shunting one of the operating windings of the operating motor of valve 43 causing the valve to move to a wide open position so that steam is admitted to the coil 41 at a maximum rate for heating the water in tank 38. When relay 140 is energized, switch blade 142 is moved away from contact 144 interrupting the circuit of the fan motor 13 stopping the fan and terminating the circulation of air through the duct 10. Also when relay 140 is energized, switch blade 143 engages contact 145 completing a circuit for relay 147 as follows: from line conductor 195, through wire 196, winding 148, wire 227, contact 145, switch blade 143, wire 228, back to line conductor 200. When relay 147 is energized, switch blade 149 is brought into engagement with contact 150, completing a circuit for the motor of pump 36 as follows: from line conductor 195, through wire 201, contact 150, switch blade 149, wire 202, the motor of pump 36, wire 203 and wire 199 back to line conductor 200.

Thus it is to be seen that when the switch 152 closes for defrosting purposes when the compressor is operating at high speed the compressor motor is deenergized, the steam valve 43 is opened wide, the fan 12 is stopped and the pump 36 is started in operation to pump hot water through the pipe 35 to be discharged through the spray nozzles and over the evaporator. The hot water being sprayed over the evaporator defrosts it relatively quickly. The mercury switch 157 opens at a suction pressure sufficiently high to insure that the evaporator temperature has risen to a value high enough such that all the frost has been evaporated therefrom. When the mercury switch 157 opens, the relays 92 and 140 are deenergized, the fan 12 is placed back in operation, the pump 36 is stopped and the valve 43 is placed back under the control of the controller 67.

During normal operation when the evaporator 16 is operating at a relatively high temperature, that is, when above 35° F., the controller 165 will cause operation of the pump 36 in the manner already described. Thus unheated water will be sprayed into the air stream and over the evaporator, and this water will serve to provide for better heat exchange between the evaporator and the air passing through the duct 10.

From the foregoing, it is to be seen that I have provided a system utilizing a refrigeration coil which is operated at times at temperatures below freezing. The system provides for substantially continuous operation with automatic defrosting of the refrigeration coil, the system providing for the maintenance of desirable wet and dry bulb temperatures of the air in the space being conditioned. With the arrangement of my invention, desirable wet and dry bulb temperature can be maintained over a wide range of loads and by means of the heated sprays the refrigerating unit can be quickly and efficiently defrosted when necessary.

The single embodiment of my invention which I have disclosed is representative, and my disclosure is to be interpreted in an illustrative rather than a limiting sense, the invention to be limited only in accordance with the claims appended hereto.

I claim as my invention:

1. In an air conditioning system, in combination, refrigerating apparatus including a source of refrigerant and a cooling unit, means for passing air to be conditioned in heat exchange relationship with the unit, means responsive to a psychrometric condition of said air controlling the refrigerating apparatus, means for spraying water so as to cause it to contact said unit, means responsive to a condition of said refrigerating apparatus incident to a need for defrosting the unit, and means for heating said water, said last condition responsive means being arranged to render said heating means operative and control the spray water so as to hasten defrosting of the unit.

2. In an air conditioning system, in combination, refrigerating apparatus including a source of refrigerant and a cooling unit, means for passing air to be conditioned in heat exchange relationship with the unit, means for reducing the volume of air passing in heat exchange relationship with the unit whereby the temperature of the unit may fall below freezing causing frost to accumulate on it, means for spraying water so as to cause it to contact said unit, and means responsive to the suction pressure of said refrigerating apparatus resulting from a need for defrosting the unit, said suction pressure responsive means being arranged to control the spray water so as to hasten defrosting of the unit.

3. In an air conditioning system, in combination, refrigerating apparatus including a source of refrigerant and a cooling unit, means for passing air to be conditioned in heat exchange relationship with the unit, means for reducing the volume of air passing in heat exchange relationship with the unit whereby the temperature of the unit may fall below freezing causing frost to accumulate on it, means for spraying water so as to cause it to contact said unit, means responsive to a condition of said refrigerating apparatus incident to a need for defrosting the unit, means for heating said water, said last condition responsive means being arranged to control the temperature of the water so as to hasten defrosting of the unit, and means responsive to the temperature of the unit controlling said spraying means whereby water may be sprayed into said air without being heated when the unit is not in need of defrosting.

4. In an air conditioning system, in combination, refrigerating apparatus including a source of refrigerant and a cooling unit, means for passing air to be conditioned in heat exchange relationship with the unit, means responsive to a psychrometric condition of said air controlling the refrigerating apparatus, means for spraying water so as to cause it to contact said unit, means responsive to a condition of said refrigerating apparatus incident to a need for defrosting the unit, means for heating said water, said last condition responsive means being arranged to render said heating means operative and control the spray water so as to hasten defrosting of the unit, and means by which said last condition responsive means causes passage of air in heat exchange relationship with the unit to be interrupted while it is defrosting.

5. In an air conditioning system, in combination, refrigerating apparatus including a source of refrigerant and a cooling unit, means for passing air to be conditioned in heat exchange relationship with the unit, means for reducing the volume of air passing in heat exchange relationship with the unit whereby the temperature of the unt may fall below freezing causing frost to accumulate on it, means for spraying water so as to cause it to contact said unit, means responsive to the suction pressure of said refrigerating apparatus resulting from a need for defrosting the unit, said last condition responsive means being arranged to control the spray water so as to hasten defrosting of the unit, and means by which said last condition responsive means causes passage of air in heat exchange relationship with the unit to be interrupted while it is defrosting.

6. In an air conditioning system, in combination, refrigerating apparatus including a source of refrigerant and a cooling unit, means for passing air to be conditioned in heat exchange relationship with the unit, means influenced by a psychrometric condition of the air for operating said cooling unit at temperatures below freezing whereby frost accumulates on it, means for spraying water so as to cause it to contact said unit, means for heating said water, and control means for interrupting operation of the refrigerating apparatus to defrost the unit, said control means being arranged to render said heating means operative and control the spray water for hastening defrosting of the evaporator.

7. In an air conditioning system, in combination, refrigerating apparatus including a source of refrigerant and a cooling unit, means for passing air to be conditioned in heat exchange relationship with the unit, means influenced by a psychrometric condition of the air for operating said cooling unit at temperatures below freezing whereby frost accumulates on it, means for spraying water so as to cause it to contact said unit, means for heating said water, control means for interrupting operation of the refrigerating apparatus to defrost the unit, said control means being arranged to render said heating means operative and control the spray water for hastening defrosting of the evaporator, and means by which said control means causes passage of air in heat exchange relationship with the unit to be interrupted when the unit is to be defrosted.

8. In an air conditioning system, in combination, refrigerating apparatus including a source of refrigerant and a cooling unit, means for passing air to be conditioned in heat exchange relationship with the unit, means responsive to the temperature and moisture content of the air for operating said cooling unit at temperatures above and below freezing whereby frost accumulates on it at times, means for spraying water so as to cause it to contact said unit, means for heating said water, control means for interrupting operation of the refrigerating apparatus to defrost the unit, said control means being arranged to control the temperature of said water for hastening defrosting of the evaporator, and means responsive to an above freezing temperature of the unit for controlling said spraying means in such manner that water may be sprayed into said air without being heated when the unit is not in need of defrosting.

9. In an air conditioning system, in combination, air cooling means comprising refrigerating apparatus having an evaporator, means for passing air over the evaporator, means responsive to air temperature for controlling the refrigerating apparatus, means for spraying water so as to cause it to contact the air being conditioned and also the evaporator, means for heating said water, means responsive to the moisture content of the air for controlling the temperature of said water, and control means for interrupting operation of the refrigerating apparatus for defrosting the evaporator, said control means being arranged to control the spraying means and the temperature of the water for hastening defrosting of the evaporator.

10. In an air conditioning system, in combination, air cooling means comprising refrigerating apparatus having an evaporator, means for passing air over the evaporator, means responsive to air temperature for controlling the refrigerating apparatus, means for spraying water so as to cause it to contact the air being conditioned and also the evaporator, means for heating said water, means responsive to the moisture content of the air for controlling the temperature of said water, control means for interrupting operation of the refrigerating apparatus for defrosting the vaporator, said control means being arranged to control the spraying means and the temperature of the water for hastening defrosting of the evaporator and means by which said control means interrupts passage of air over the evaporator when it is to be defrosted.

11. In an air conditioning system, in combination, means forming a duct, means for passing air through said duct, apparatus for removing sensible and latent heat from air in said duct, means for normally regulating the proportion of air passed over said apparatus, means responsive to the moisture content of the air controlling said regulating means to decrease the proportion of air passing over said apparatus on increase in said moisture content, said moisture responsive means also controlling said apparatus to regulate the removal of latent heat from the air, thermostatic means responsive to air temperature controlling said apparatus to regulate the removal of sensible heat from the air, and means for heating the air controlled by said thermostatic means, said apparatus being arranged to operate at relatively high capacity in response to said moisture responsive means and at relatively low capacity in response to said temperature responsive means.

12. In an air conditioning system, in combination, means forming a duct, means for passing air through said duct, apparatus for removing sensible and latent heat from air in said duct, means for normally regulating the proportion of air passed over said apparatus, means responsive to the moisture content of the air controlling said regulating means, said moisture responsive means also controlling said apparatus to regulate the removal of latent heat from the air, thermostatic means responsive to air temperature controlling said apparatus to regulate the removal of sensible heat from the air, means for spraying water into the air in said duct, means for heating said water, and means by which said moisture responsive means controls said water heating means to control the temperature of the water to increase the amount of moisture added to the air upon an increase in the demand therefor.

13. In an air conditioning system, in combination, air cooling apparatus comprising a device over which air is adapted to be passed for removing sensible and latent heat from the air, means for operating said device at temperatures causing it to become frosted, means for spraying fresh water into said air and over said device, means for heating said water, means responsive to humidity of the cooled air for controlling said water heating means for increasing the temperature of said spray water upon an increased demand for moisture in the air, and means for controlling said water heating means and said spraying means to spray water over said device at a relatively high temperature for defrosting the device.

14. In an air conditioning system, in combination, air cooling apparatus comprising a device over which air is adapted to be passed for removing sensible and latent heat from the air, means for operating said device at temperatures causing it to become frosted, means for spraying fresh water into said air and over said device, means for heating said water, means responsive to humidity of the cooled air for controlling said water heating means for increasing the temperature of said spray water when humidification of the air is required and decreasing the temperature of said device when dehumidification is required, and means for controlling said water heating means and spraying means for causing water to be sprayed over said device at relatively high temperature for defrosting the device.

15. In an air conditioning system, in combination, air cooling apparatus comprising a device over which air is adapted to be passed for removing sensible and latent heat from the air, means for operating said device at temperatures causing it to become frosted, means for spraying fresh water into said air and over said device, means for heating said water, means responsive to humidity of the cooled air for controlling said water heating means for increasing the temperature of said spray water when humidification of the air is required and decreasing the temperature of said device when dehumidification is required, means for controlling the dry bulb temperature of the cooled air including means controlling said device for removing sensible heat from the air, and means for controlling said water heating means and said spraying means for causing water to be sprayed over said device at relatively high temperature for defrosting the device.

16. In an air conditioning system, in combination, refrigerating apparatus including a source of refrigerant and a cooling unit, means for passing air to be conditioned in heat exchange relationship with the unit, means for reducing the volume of air passing in heat exchange relationship with the unit whereby the temperature of the unit may fall below freezing causing frost to accumulate on it, means for spraying water so as to cause it to contact said air and also said unit, means for heating said water, humidity responsive means controlling said air volume reducing means, temperature responsive means controlling said refrigerating apparatus, and control means for interrupting operation of the refrigerating apparatus for defrosting the unit, said control means being arranged to cause heating of the spray water for hastening defrosting of the unit.

17. In apparatus of the character described, in combination, refrigerating apparatus including an evaporator, means for passing air to be cooled over the evaporator, means for operating the evaporator at temperatures below freezing so that the evaporator becomes frosted, means for spraying water over the evaporator to increase the rate of heat transfer between the air and the evaporator, and means for heating said sprayed water in response to a decrease in suction pressure indicating that the evaporator should be defrosted.

18. In apparatus of the character described, in combination, refrigerating apparatus including an evaporator, means for normally circulating air over the evaporator while the evaporator is operating to produce cooling, means for defrosting the evaporator including means for spraying water over the evaporator, and control means responsive to suction pressure normally resulting from a frosted state of the evaporator for shutting down the refrigerating apparatus, the air circulating means, and causing the defrosting means to operate.

19. In apparatus of the character described, in combination, refrigerating apparatus including an evaporator, means for normally circulating air over the evaporator while the evaporator is operating to produce cooling, means for defrosting the evaporator including means for spraying water over the evaporator, means for heating said water and control means responsive to suction pressure normally resulting from a frosted state of the evaporator for shutting down the refrigerating apparatus, the air circulating means, and causing the defrosting means to operate.

20. In an air conditioning system, in combination, a cooling means, means for passing air over the cooling means, means for spraying water into the air, means for heating the water, moisture responsive means in control of said cooling means and water heating means for operating said cooling means to produce a relatively low temperature when dehumidification is desired and for operating said water heating means to heat the water when humidification is desired, and air temperature responsive means for operating said cooling means at a relatively high temperature and for preventing heating of the water by said water heating means when the air temperature is too high.

21. In an air conditioning system, in combination, a cooling means, means for passing air over the cooling means, means for spraying water into the air, means for heating the water, means responsive to the temperature of the cooling means in control of said water spraying means to cause the spraying of the water into the air when the temperature of the cooling means is relatively high, moisture responsive means in control of said cooling means, and water heating means for operating said cooling means to produce a relatively low temperature when dehumidification is desired and for operating said water heating means to heat the water when humidification is desired, and air temperature responsive means for operating said cooling means at a relatively high temperature and for preventing heating of the water by said water heating means when the air temperature is too high.

22. In apparatus of the character described, in combination, refrigerating apparatus including an evaporator, means for passing air to be cooled over the evaporator, means for operating the evaporator at temperatures below freezing so that the evaporator becomes frosted, a source of water, means for heating said water and spraying it upon said evaporator, means responsive to a demand for humidification in control of said last named means, and means responsive to a condition resulting from a need for defrosting the evaporator for also controlling said water heating and spraying means to cause heated water to be sprayed upon said evaporator.

23. In apparatus of the character described, in combination, refrigerating apparatus including an evaporator, means for passing air to be cooled over the evaporator, means for operating the evaporator at temperatures below freezing so that the evaporator becomes frosted, a source of water, means for heating said water and spraying it upon said evaporator, means responsive to a demand for humidification in control of said water heating and spraying means, means responsive to a condition resulting from a need for defrosting the evaporator for also controlling said water heating and spraying means to cause heated water to be sprayed upon said evaporator, and means for interrupting passage of air over the evaporator when it is defrosting.

WILLIAM L. McGRATH.